US012687697B2

(12) United States Patent
Seo et al.

(10) Patent No.: US 12,687,697 B2
(45) Date of Patent: Jul. 21, 2026

(54) OPTICAL SYSTEM AND CAMERA MODULE COMPRISING SAME

(71) Applicant: LG INNOTEK CO., LTD., Seoul (KR)

(72) Inventors: Eun Sung Seo, Seoul (KR); Ji Sung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 325 days.

(21) Appl. No.: 18/263,370

(22) PCT Filed: Jan. 26, 2022

(86) PCT No.: PCT/KR2022/001385
§ 371 (c)(1),
(2) Date: Jul. 28, 2023

(87) PCT Pub. No.: WO2022/164196
PCT Pub. Date: Aug. 4, 2022

(65) Prior Publication Data
US 2024/0302629 A1 Sep. 12, 2024

(30) Foreign Application Priority Data

Jan. 28, 2021 (KR) ........................ 10-2021-0012629

(51) Int. Cl.
*G02B 13/00* (2006.01)
*G02B 15/14* (2006.01)
(52) U.S. Cl.
CPC ........ *G02B 13/0045* (2013.01); *G02B 15/142* (2019.08)
(58) Field of Classification Search
CPC .... G02B 9/60; G02B 13/009; G02B 13/0045; G02B 15/142–1425; G02B 15/22–28
See application file for complete search history.

(56) References Cited

U.S. PATENT DOCUMENTS 5,082,360 A 1/1992 Sato et al.
5,663,837 A 9/1997 Ohtake et al.
(Continued)

FOREIGN PATENT DOCUMENTS

CN 1213085 A 4/1999
CN 103443686 A 12/2013
(Continued)

OTHER PUBLICATIONS

International Search Report dated May 16, 2022 in International Application No. PCT/KR2022/001385.
(Continued)

*Primary Examiner* — Nicholas R. Pasko
(74) *Attorney, Agent, or Firm* — SALIWANCHIK, LLOYD & EISENSCHENK

(57) ABSTRACT

An optical system disclosed to an embodiment of the invention includes first and second lens groups sequentially arranged along an optical axis from an object side to a sensor direction and including at least one lens, respectively, and a focal length sign of the first lens group and a focal length sign of the second lens group are opposite to each other and satisfy the following equation: $-1.5 < f\_2/f\_1/0$ ($f\_1$ is the focal length of the first lens group, and $f\_2$ is the focal length of the second lens group), the effective diameter (clear aperture) of the lenses included in the first and second lens groups is smaller than a diagonal length of the image sensor, and one lens group of the first and second lens groups may be disposed in the optical axis direction.

20 Claims, 9 Drawing Sheets

(56) References Cited

U.S. PATENT DOCUMENTS

| | | |
|---|---|---|
| 5,790,318 A | 8/1998 | Sato |
| 5,982,560 A | 11/1999 | Moon |
| 8,681,433 B2 | 3/2014 | Ono |
| 8,717,683 B2 | 5/2014 | Toyoda et al. |
| 9,678,305 B2 | 6/2017 | Sakai |
| 9,952,404 B2 | 4/2018 | Son |
| 10,838,168 B2 | 11/2020 | Son |
| 11,307,391 B2 | 4/2022 | Yamazoe et al. |
| 11,921,352 B2 | 3/2024 | Son |
| 12,228,794 B2 | 2/2025 | Son |
| 2008/0106800 A1* | 5/2008 | Shin ............... G02B 15/143503 |
| | | 359/689 |
| 2011/0141576 A1 | 6/2011 | Seo |
| 2011/0157430 A1 | 6/2011 | Hosoya et al. |
| 2012/0008214 A1 | 1/2012 | Toyoda et al. |
| 2013/0235467 A1 | 9/2013 | Heu |
| 2013/0335831 A1 | 12/2013 | Ono |
| 2016/0161719 A1 | 6/2016 | Son |
| 2018/0196224 A1 | 7/2018 | Son |
| 2019/0324236 A1* | 10/2019 | Kim ..................... G02B 13/009 |
| 2021/0026106 A1 | 1/2021 | Son |
| 2021/0063702 A1* | 3/2021 | Kim ................... G02B 13/0045 |
| 2021/0063704 A1* | 3/2021 | Son ................... G02B 13/0045 |
| 2021/0157090 A1* | 5/2021 | Lin ........................ G02B 13/18 |
| 2022/0075163 A1* | 3/2022 | Tang .................... G02B 15/143 |
| 2024/0168257 A1 | 5/2024 | Son |
| 2024/0353660 A1* | 10/2024 | Kim ......................... G02B 9/62 |
| 2025/0155676 A1 | 5/2025 | Son |
| 2025/0189760 A1* | 6/2025 | Kim ......................... G02B 9/60 |

FOREIGN PATENT DOCUMENTS

| | | |
|---|---|---|
| CN | 104880812 A | 9/2015 |
| CN | 111175937 A | 5/2020 |
| CN | 111830692 A | 10/2020 |
| JP | 3-243928 A | 10/1991 |
| JP | 10-104516 A | 4/1998 |
| JP | 2822541 B2 | 11/1998 |
| JP | 2001-166207 A | 6/2001 |
| JP | 2011-138047 A | 7/2011 |
| JP | 2012-18277 A | 1/2012 |
| KR | 10-0453340 B1 | 5/2005 |
| KR | 10-0453339 B1 | 6/2005 |
| KR | 10-2013-0103123 A | 9/2013 |
| KR | 10-1720770 B1 | 3/2017 |
| KR | 10-1842255 B1 | 3/2018 |

OTHER PUBLICATIONS

Office Action dated Jul. 4, 2025 in Taiwanese Application No. 111103189.
Office Action dated Mar. 3, 2026 in Japanese Application No. 2023-546069.
Office Action dated Apr. 22, 2026 in Chinese Application No. 202280012322.

* cited by examiner

Curvature amount according to a change of focal length between groups

Focal length of Group 2 / Focal length of Group 1

OPTICAL SYSTEM AND CAMERA MODULE COMPRISING SAME

CROSS-REFERENCE TO RELATED APPLICATIONS

This application is the U.S. national stage application of International Patent Application No. PCT/KR2022/001385, filed Jan. 26, 2022, which claims the benefit under 35 U.S.C. § 119 of Korean Application No. 10-2021-0012629, filed Jan. 28, 2021, the disclosures of each of which are incorporated herein by reference in their entirety.

TECHNICAL FIELD

An embodiment relates to an optical system having improved optical performance and a slim structure, and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or prevent-inhibit image stabilization due to an unstable fixing device or a camera movement caused by a user's movement. The most important element for this camera module to obtain an image is an imaging lens that forms an image. Recently, interest in high performance such as high image quality and high resolution is increasing, and research on an optical system including a plurality of lenses is being conducted in order to realize this. For example, research using a plurality of imaging lenses having positive (+) or negative (−) refractive power to implement a high-performance optical system is being conducted. However, when a plurality of lenses is included, the entire optical system may increase, and it is difficult to derive excellent optical and aberration characteristics.

When the optical system includes a plurality of lenses, zoom and autofocus functions may be performed by controlling the position of at least one lens or a lens group including at least one lens. However, when the lens or the lens group intends to perform the above function, the movement amount of the lens or the lens group may increase exponentially. Accordingly, the device including the optical system may require a lot of energy, and there are problems in that a design considering the amount of movement is required. When the optical system includes a plurality of lenses, the entire length and height of the optical system may be increased by the thickness, interval, and size of the plurality of lenses. Accordingly, the entire thickness of the device of the smart phone or mobile terminal in which the optical system is disposed may increase, and it is difficult to provide a smaller size. Therefore, a new optical system capable of solving the above problems is required.

DISCLOSURE

Technical Problem

An embodiment of the invention provides an optical system and a camera module with improved optical properties. An embodiment provides an optical system and a camera module capable of providing an autofocus (AF) function for a subject located at various distances. The embodiment provides an optical system and a camera module that may be implemented in a small and compact. The embodiment is intended to provide a camera module applicable to a folded camera having a thin thickness.

Technical Solution

An optical system according to an embodiment of the invention includes first and second lens groups sequentially arranged along an optical axis from an object side to a sensor direction and including at least one lens, respectively, and a focal length sign of the first lens group and a focal length sign of the second lens group are opposite to each other and satisfy the following equation: $-1.5 < f\_2/f\_1/0$ ($f\_1$ is the focal length of the first lens group, and $f\_2$ is the focal length of the second lens group), the effective diameter (clear aperture) of the lenses included in the first and second lens groups is smaller than a diagonal length of the image sensor, and one lens group of the first and second lens groups may be disposed in the optical axis direction.

According to an embodiment of the invention, the first lens group includes first to third lenses sequentially disposed along the optical axis from the object side to the sensor side, and the second lens group may include fourth and fifth lenses sequentially disposed along the optical axis from the object side to the sensor-side direction. A lens disposed closest to the object side in the first lens group may have a positive refractive power, and a sensor-side surface of the lens disposed closest to the object side in the first lens group may have a convex shape. A lens disposed closest to the image sensor in the second lens group may have negative refractive power, and a sensor-side surface of the lens disposed closest to the image sensor in the second lens group may have a convex shape.

According to an embodiment of the invention, an object-side surface of the lens disposed closest to the object-side in the second lens group may have a concave shape. The first and second lens groups may satisfy [Equation 1] $1 < L\_G1/L\_G2 < 4$ (in Equation 1, L_G1 means a distance in the optical axis direction from an apex of the object-side surface of the lens closest to the object among the lenses included in the first lens group to an apex of the sensor-side surface of the lens closest to the image sensor. In addition, L_G2 means a distance in the optical axis direction from an apex of the object-side surface of the lens closest to the object among the lenses included in the second lens group to an apex of the sensor-side surface of the lens closest to the image sensor.).

According to an embodiment of the invention, the second lens group may satisfy [Equation 2] $4 < TTL/L\_G2 < 7$ (in Equation 2, L_G2 means the length in the optical axis (OA) direction from an apex of the object-side surface of the lens closet to the object among the lenses included in the second lens group to the apex of the sensor-side surface of the lens closest to the image sensor, and TTL (Total Track Length) means a distance in the optical axis direction from the apex of the object-side surface of the lens closest to the object among the plurality of lenses included in the first and second lens groups to the upper surface of the image sensor.).

According to an embodiment of the invention, the first lens group may include at least one lens having a non-circular shape.

A camera module according to an embodiment may include the optical system and a driving member, and the driving member may control a position of the second lens group.

Advantageous Effects

An optical system and a camera module according to an embodiment of the invention may have improved optical properties. In detail, the effective focal length (EFL) may be controlled by moving at least one lens group among the plurality of lens groups, and the moving distance of the moving lens group may be minimized. Accordingly, it is possible to minimize the amount of curvature generated according to the moving distance of the moving lens group, thereby minimizing deterioration of the image quality of the periphery. The embodiment may minimize the movement distance of the moving lens group, thereby minimizing power consumption required for the movement of the lens group. The embodiment may provide an autofocus (AF) function for a subject located at various distances using an optical system having a set shape, focal length, spacing, and the like. In detail, the embodiment may provide an autofocus (AF) function for a subject located at infinity or near by using one camera module. The embodiment may have a constant TTL value irrespective of the distance from the subject in the range of infinity to near field. Accordingly, the optical system and the camera module including the same may be provided with a slimmer structure.

The optical system and the camera module according to the embodiment may include at least one lens having a non-circular shape. Accordingly, the optical system may have improved optical performance and may be implemented in a compact size, and thus may be provided more compactly compared to an optical system having only a circular shape. The optical system and the camera module according to the embodiment may include an optical path changing member. Accordingly, the optical system may be applied to a folded camera that may have a thinner thickness, and a device including the camera may be manufactured with a thin thickness.

BEST MODE

Figure 1:
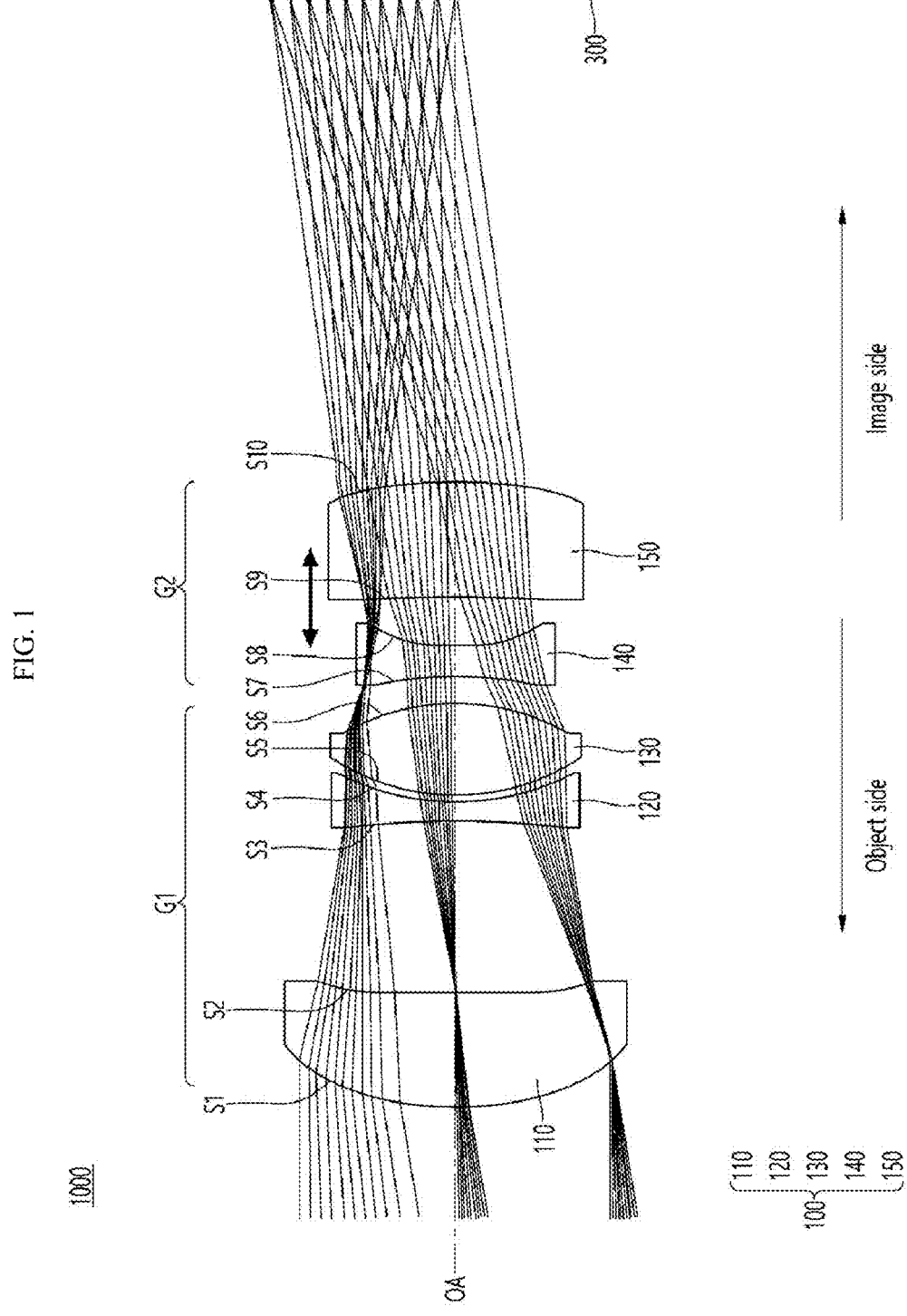
FIG. 1 is a block diagram of an optical system according to an embodiment operating in a first mode.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

The convex surface of the lens may mean that the lens surface of the region corresponding to the optical axis has a convex shape, and the concave lens surface may mean that the lens surface of the region corresponding to the optical axis has a concave shape. there is. "Object side" may mean a surface of the lens that faces the object side with respect to the optical axis, and "sensor side" may mean a surface of the lens that faces the image sensor with respect to the optical axis. The vertical direction may mean a direction perpendicular to the optical axis, and the end of the lens or the lens surface may mean the end of the effective region of the lens through which the incident light passes. The center thickness of the lens may mean a length in the optical axis direction between the object side and the sensor side in the optical axis of the lens.

Figure 2:
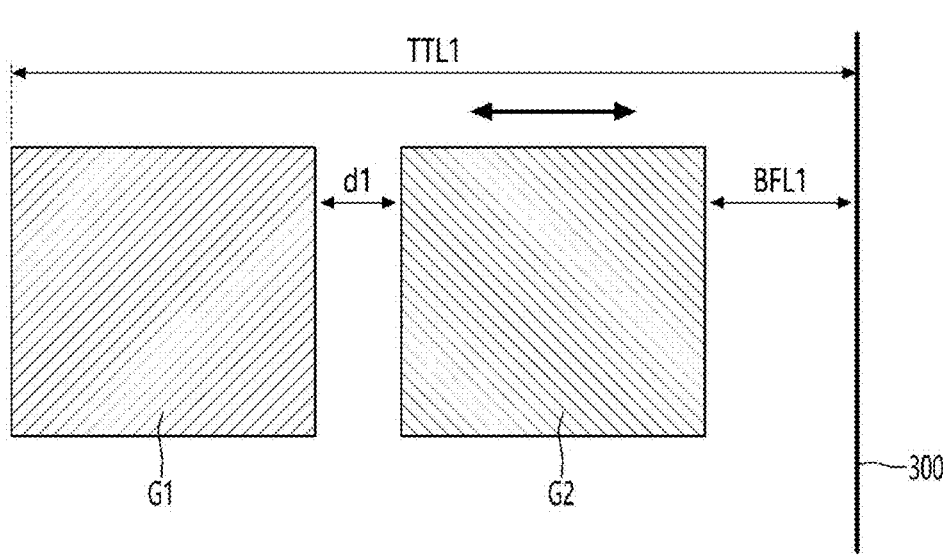
FIG. 2 is a view for explaining a TTL (total track length) and a BFL (back focal length) of an optical system operating in the first mode.
Figure 3:
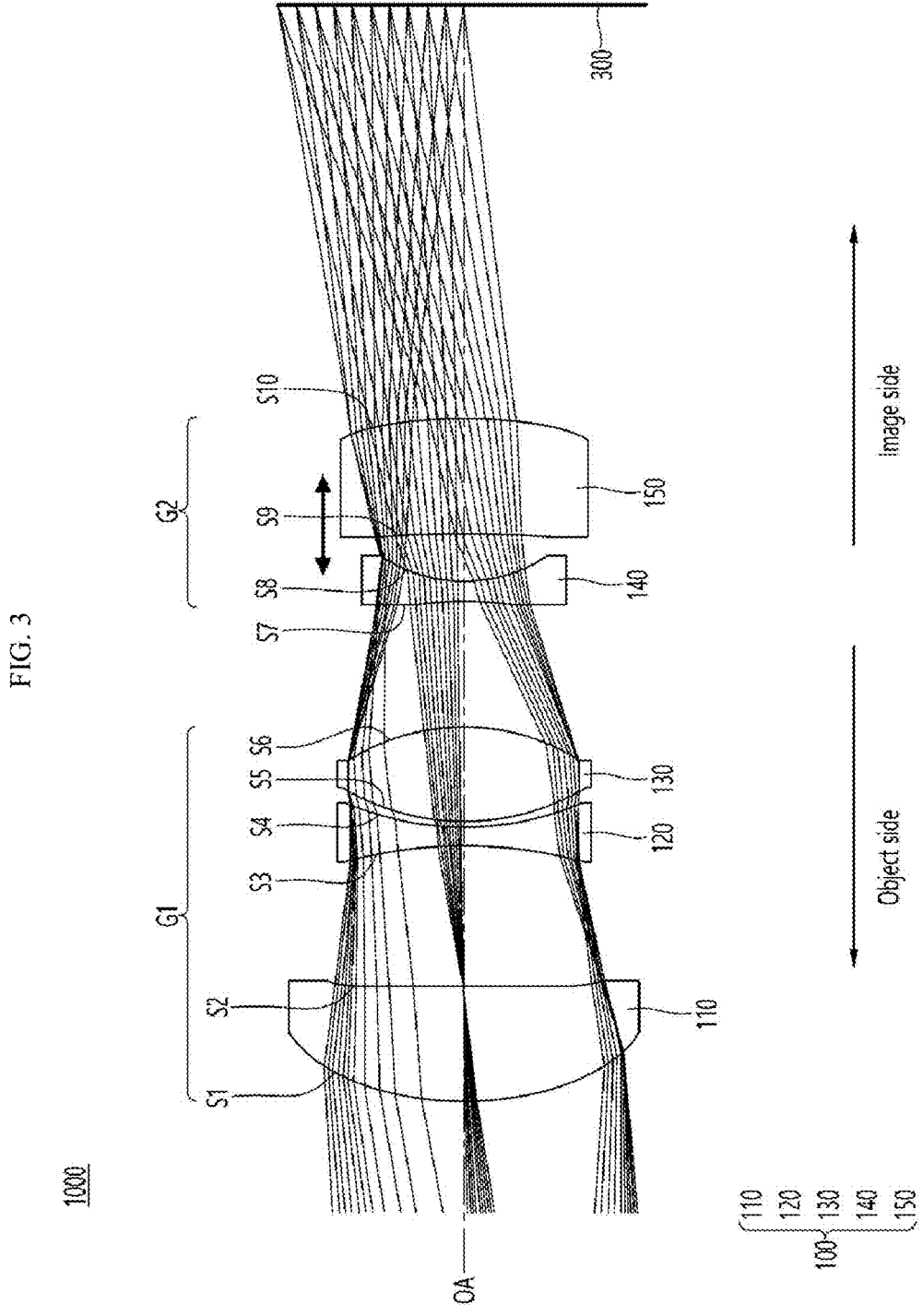
FIG. 3 is a configuration diagram of an optical system according to an embodiment operating in a second mode.
Figure 4:
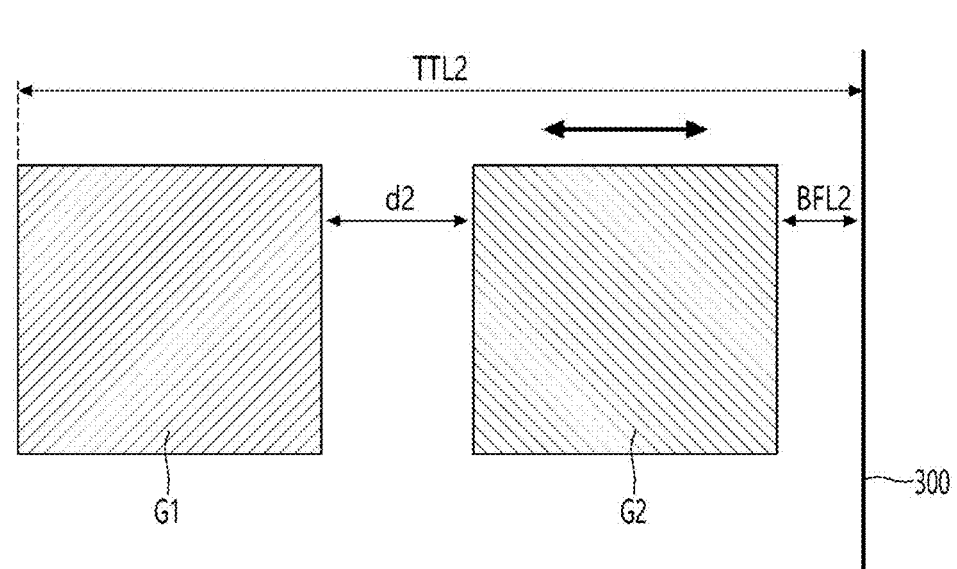
FIG. 4 is a view for explaining TTL and BFL of an optical system operating in the second mode.
Figure 5:
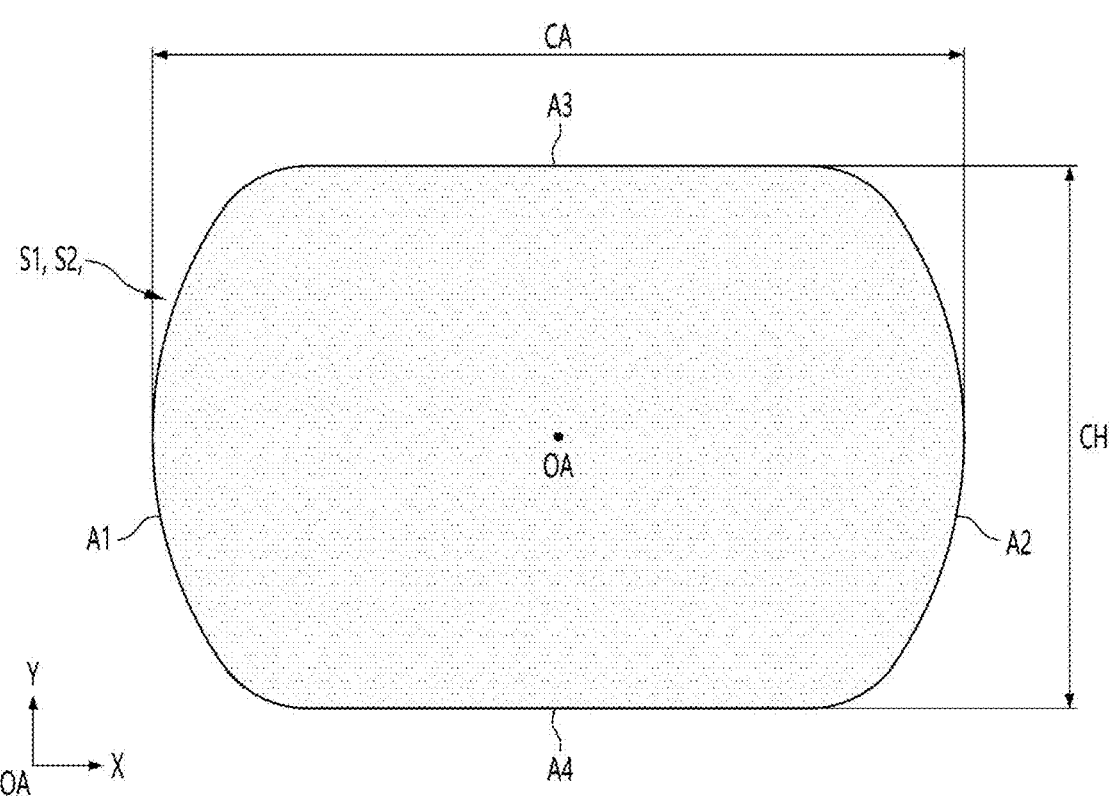
FIG. 5 is a view for explaining a lens having a non-circular shape.
Figure 6:
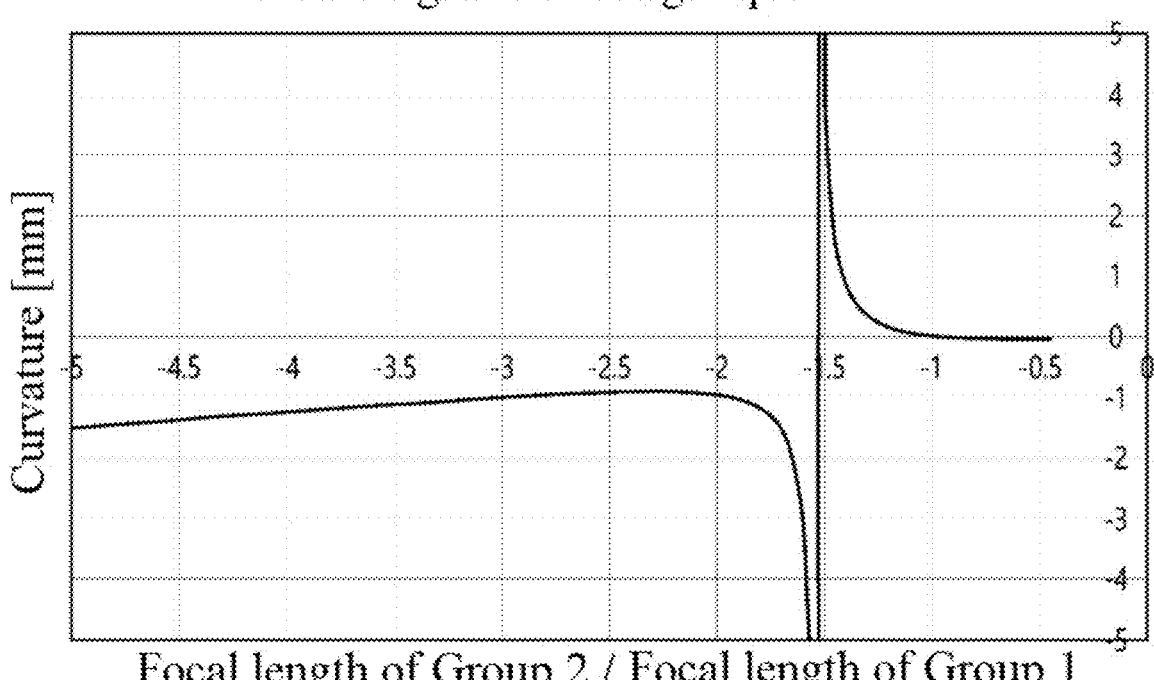
FIG. 6 is a graph showing focal lengths and curvature aberrations of first and second lens groups in the optical system according to the embodiment.
Figure 7:
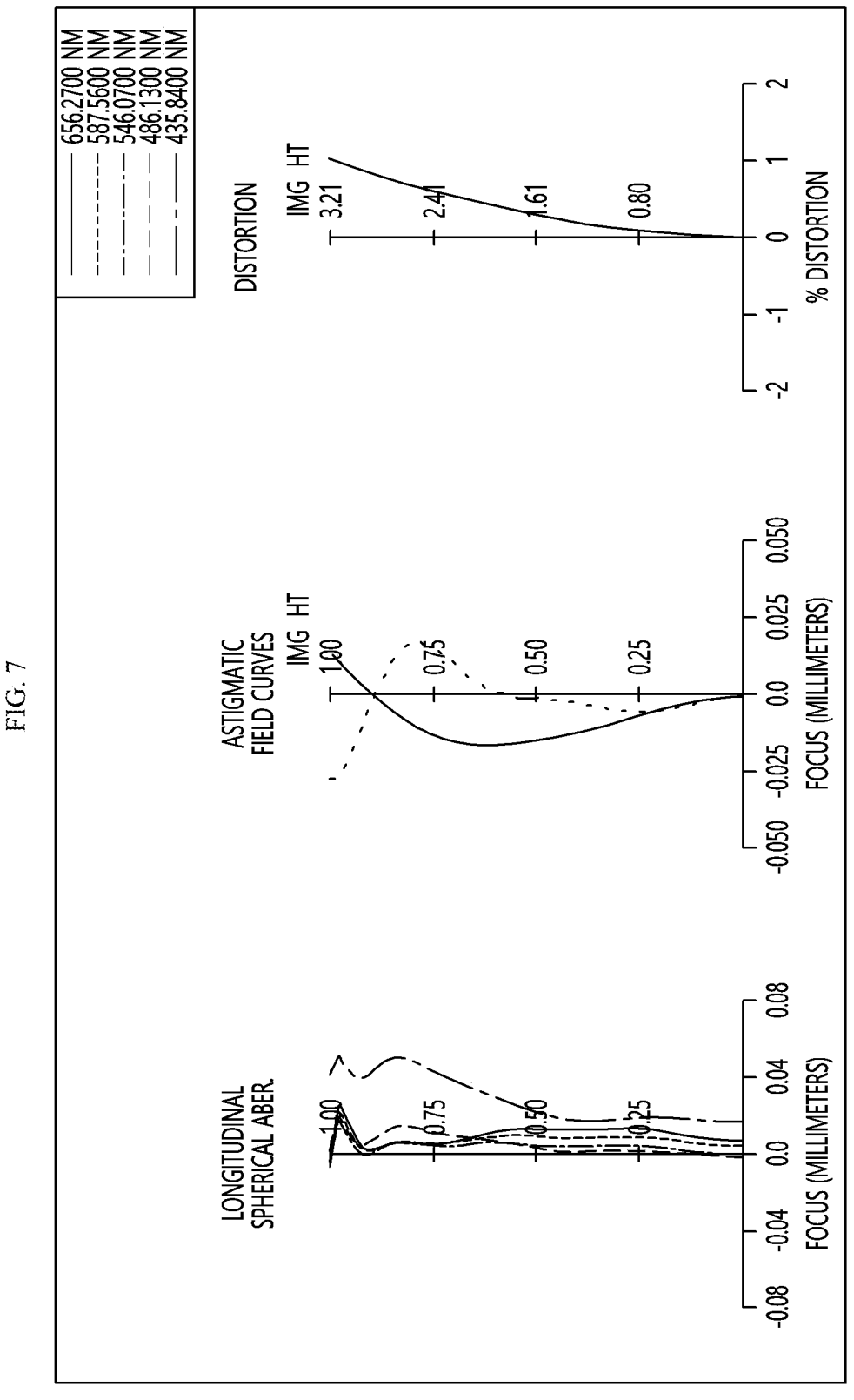
FIG. 7 is a graph of an aberration diagram when the optical system according to the embodiment operates in the first mode.
Figure 8:
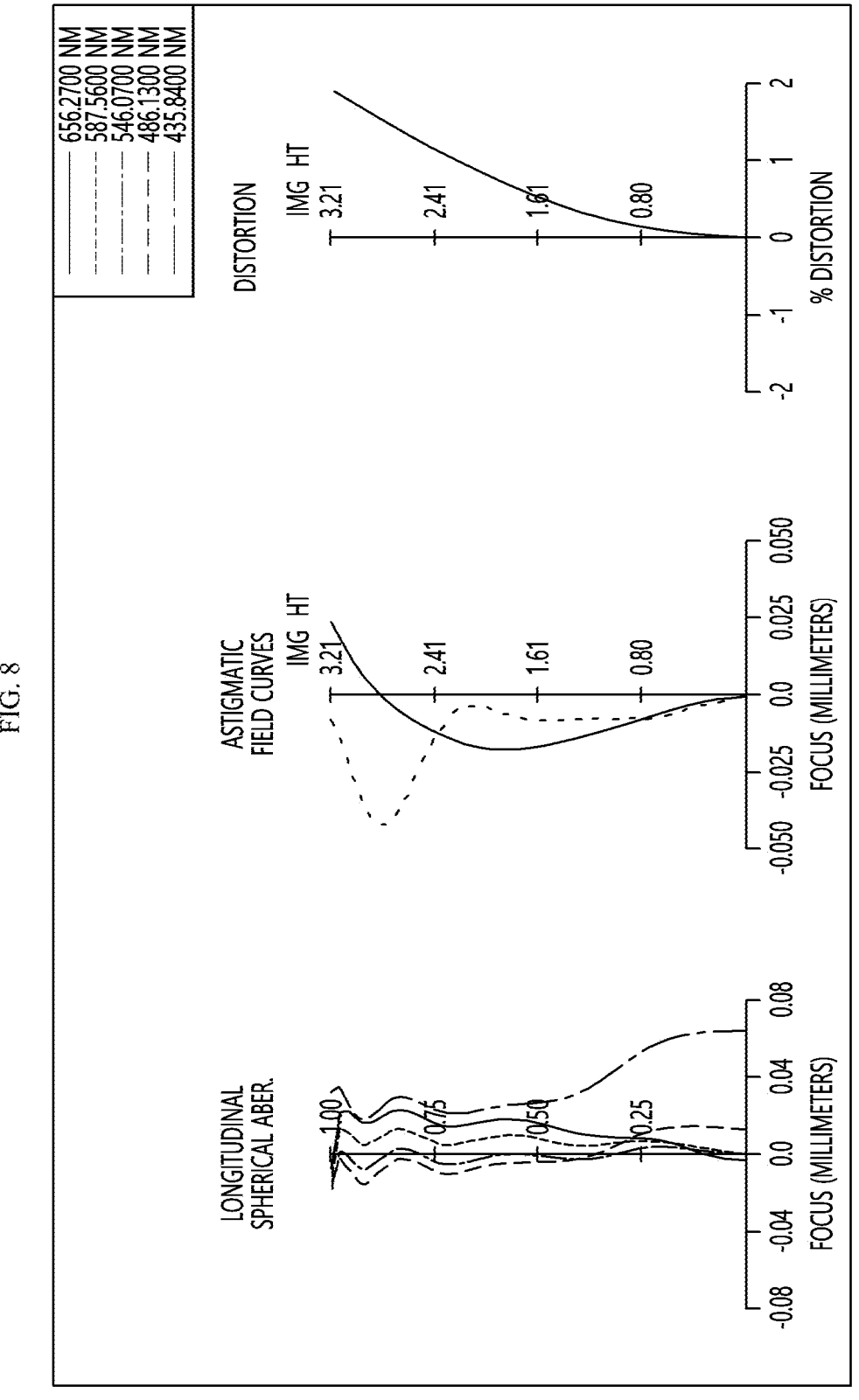
FIG. 8 is a graph showing an aberration diagram when the optical system according to the embodiment operates in the second mode.

FIG. 1 is a block diagram of an optical system according to an embodiment operating in the first mode, and FIG. 2 is a view for explaining TTL (Total Track Length) and BFL (Back focal length) of the optical system operating in the first mode, FIG. 3 is a configuration diagram of an optical system according to an embodiment operating in the second mode, FIG. 4 is a diagram for explaining TTL and BFL of the optical system operating in the second mode, FIG. 5 is a view for explaining a lens having a non-circular shape, FIG. 6 is a graph showing focal lengths and curvature aberrations of first and second lens groups in the optical system according to the embodiment, FIGS. 7 and 8 are a graph of an aberration diagram when the optical system according to the embodiment operates in the first mode and the second mode.

Referring to FIGS. 1 to 4, the optical system 1000 according to the embodiment may include a plurality of lens groups. In detail, the optical system 1000 may include a plurality of lens groups including at least one lens. For example, the optical system 1000 may include a first lens group G1, a second lens group G2, and an image sensor 300 sequentially arranged along the optical axis OA from the object side to the sensor direction. The first lens group G1 may have positive (+) or negative (−) refractive power. For example, the first lens group G1 may have positive (+) refractive power. Also, the second lens group G2 may have negative (−) or positive (+) refractive power. The second lens group G2 may have a refractive power opposite to that of the first lens group G1. For example, when the first lens group G1 has positive (+) refractive power as described above, the second lens group G2 may have negative (−) refractive power. The first lens group G1 and the second lens group G2 may have different focal lengths. In detail, as the first and second lens groups G1 and G2 have opposite refractive powers, the focal length of the second lens group G2 and the first lens group G1 may have opposite sign (+, −). The focal lengths of the first lens group G1 and the second lens group G2 may satisfy the following equation.

$$-1.5 < f\_2/f\_1 < 0 \qquad \text{[Equation]}$$

(f_1 is the focal length of the first lens group, and f_2 is the focal length of the second lens group.)

As the focal lengths of the first lens group G1 and the second lens group G2 satisfy the above-described range, the optical system 1000 may provide an autofocus (AF) function for an object located at infinity or near. In addition, as the first and second lens groups G1 and G2 satisfy the above-described focal length, the amount of curvature occurring according to the moving distance of the moving lens group may be minimized. Accordingly, the optical system 1000 may minimize the deterioration of the image quality of the peripheral portion when the focus is changed from infinity to near field.

The first lens group G1 may include at least one lens. The first lens group G1 may include a plurality of lenses. In detail, the first lens group G1 may include two or more lenses. The plurality of lenses included in the first lens group G1 may have a set interval. In detail, the interval between the plurality of lenses included in the first lens group G1 may be constant without changing in an operation mode to be described later. For example, the interval between the first lens 110 and the second lens 120 and the interval between the second lens 120 and the third lens 130 may be constant without changing in an operation mode to be described later.

Here, the interval between the plurality of lenses may mean a distance in the optical axis OA direction between centers of adjacent lenses.

The second lens group G2 may include at least one lens. The second lens group G2 may include a plurality of lenses. In detail, the second lens group G2 may include two or more lenses. The second lens group G2 may include fewer or the same number of lenses than the first lens group G1. The plurality of lenses included in the second lens group G2 may have a set interval. In detail, the interval between the plurality of lenses included in the second lens group G2 may be constant without changing in an operation mode to be described later. For example, the interval between the fourth lens 140 and the fifth lens 150 may be constant without changing according to an operation mode to be described later. Here, the interval between the plurality of lenses may mean a distance in the optical axis OA direction between centers of adjacent lenses.

The optical system 1000 may include a plurality of lens groups G1 and G2 and an image sensor 300 sequentially arranged from the object side to the sensor direction. In addition, the optical system 1000 includes four or more lenses 100 included in the lens groups G1 and G2, for example, the first lens 110, the second lens 120, and the third lens 130, a fourth lens 140 and a fifth lens 150. In this case, the first lens group G1 may include the first to third lenses 110, 120, 130, and the second lens group G2 may include the fourth and fifth lenses 140 and 150. The first to fifth lenses 110, 120, 130, 140, and 150 and the image sensor 300 may be sequentially disposed along the optical axis OA of the optical system 1000.

Each of the plurality of lenses 100 may include an effective region and an ineffective region. The effective region may be a region through which light incident on each of the first to fifth lenses 110, 120, 130, 140 and 150 passes. That is, the effective region may be a region in which incident light is refracted to realize optical properties. The ineffective region may be disposed around the effective region. The ineffective region may be a region to which the light is not incident. That is, the ineffective region may be a region independent of the optical characteristic. Also, the ineffective region may be a region fixed to a barrel (not shown) for accommodating the lens.

The image sensor 300 may detect light. The image sensor 300 may detect light that has sequentially passed through the plurality of lenses 100, for example, the first to fifth lenses 110, 120, 130, 140, and 150. The image sensor 300 may include a charge coupled device (CCD) or a complementary metal oxide semiconductor (CMOS).

The optical system 1000 may further include a filter (not shown). The filter may be disposed between the plurality of lenses 100 and the image sensor 300. The filter may be disposed between the image sensor 300 and the second lens group G2 closest to the image sensor 300 among the plurality of lens groups. For example, the filter may be disposed between the image sensor 300 and the last lens of the second lens group G2 closest to the image sensor 300 among the plurality of lenses 100. The filter may include at least one of an infrared filter and an optical filter such as a cover glass. The filter may pass light of a set wavelength band and filter light of a different wavelength band. When the filter includes an infrared filter, radiant heat emitted from external light may be blocked from being transmitted to the image sensor 300. In addition, the filter may transmit visible light and reflect infrared light.

The optical system 1000 may include an aperture stop (not shown). The aperture stop may control the amount of light incident on the optical system 1000. The aperture stop may be located in front of the first lens 110 or between two lenses selected from among the first to fifth lenses 110, 120, 130, 140 and 150. For example, the aperture stop may be disposed between the first lens 110 and the second lens 120. In addition, at least one of the first to fifth lenses 110, 120, 130, 140 and 150 may function as an aperture stop. For example, the object-side surface or the sensor-side surface of one lens selected from among the first to fifth lenses 110, 120, 130, 140 and 150 may serve as an aperture stop for controlling the amount of light. For example, the object-side surface (the third surface S3) of the second lens 120 may serve as an aperture stop.

The optical system 1000 may further include a light path changing member (not shown). The light path changing member may change the path of the light by reflecting the light incident from the outside. The light path changing member may include a reflector and a prism. For example, the light path changing member may include a right-angle prism. When the light path changing member includes a right-angle prism, the light path changing member may change the path of the light by reflecting the path of the incident light at an angle of 90 degrees. The light path changing member may be disposed closer to the object side than the plurality of lenses 100. That is, when the optical system 1000 includes the light path changing member, the optical path changing member, the first lens 110, the second lens 120, the third lens 130 from the object side to the sensor direction, The fourth lens 140, the fifth lens 150, the filter, and the image sensor 300 may be disposed in this order. The light path changing member may change a path of light incident from the outside in a set direction. For example, in the light path changing member, a path of light incident to the light path changing member in a first direction is spaced apart in a second direction (a direction of the optical axis (OA) of the drawing in a direction in which a plurality of lenses 100 are spaced apart) that is an arrangement direction of the plurality of lenses 100. When the optical system 1000 includes a light path changing member, the optical system may be applied to a folded camera capable of reducing the thickness of the camera. In detail, when the optical system 1000 includes the light path changing member, light incident in a direction perpendicular to the surface of the device to which the optical system 1000 is applied may be changed in a direction parallel to the surface of the device. Accordingly, the optical system 1000 including the plurality of lenses 100 may have a thinner thickness in the device, and thus the device may be provided thinner. For example, when the optical system 1000 does not include the light path changing member, the plurality of lenses 100 may be disposed to extend in a direction perpendicular to the surface of the device in the device. Accordingly, the optical system 1000 including the plurality of lenses 100 has a high height in a direction perpendicular to the surface of the device, and therefore, it may be difficult to form a thin thickness of the optical system 1000 and a device including the same. However, when the optical system 1000 includes the light path changing member, the plurality of lenses 100 may be disposed to extend in a direction parallel to the surface of the device. That is, the optical system 1000 is disposed so that the optical axis OA is parallel to the surface of the device, and may be applied to a folded camera. Accordingly, the optical system 1000 including the plurality of lenses 100 may have a low height in a direction perpendicular to the surface of the device. Accordingly, the camera including the optical system 1000 may have a thin thickness in the device, and the thickness of the device may also be reduced.

Referring again to the plurality of lenses 100, the optical system 1000 may include a first lens 110, a second lens 120, a third lens 130, a fourth lens 140, a fifth lens 150, a filter, and an image sensor 300 which are sequentially disposed along the optical axis OA from the object side to the sensor direction. The first lens 110 may be disposed closest to the object side among the plurality of lenses 100, and the fifth lens 150 may be disposed closest to a side of the image sensor 300.

The first lens 110 may have positive (+) or negative (−) refractive power. The first lens 110 may include a plastic or glass material. For example, the first lens 110 may be made of a plastic material. The first lens 110 may include a first surface S1 defined as an object-side surface and a second surface S2 defined as a sensor-side surface. The first surface S1 may be convex, and the second surface S2 may be concave. That is, the first lens 110 may have a meniscus shape convex toward the object side. Alternatively, the first surface S1 may be convex, and the second surface S2 may be convex. That is, the first lens 110 may have a shape in which both surfaces are convex. At least one of the first surface S1 and the second surface S2 may be an aspherical surface. For example, both the first surface S1 and the second surface S2 may be aspherical.

The second lens 120 may have positive (+) or negative (−) refractive power. The second lens 120 may include a plastic or glass material. For example, the second lens 120 may be made of a plastic material. The second lens 120 may include a third surface S3 defined as an object-side surface and a fourth surface S4 defined as a sensor-side surface. The third surface S3 may be convex, and the fourth surface S4 may be concave. That is, the second lens 120 may have a meniscus shape convex toward the object side. Alternatively, the third surface S3 may be convex, and the fourth surface S4 may be convex. That is, the second lens 120 may have a shape in which both surfaces are convex. Alternatively, the third surface S3 may be concave, and the fourth surface S4 may be convex. That is, the second lens 120 may have a meniscus shape convex toward the sensor. Alternatively, the third surface S3 may be concave, and the fourth surface S4 may be concave. That is, the second lens 120 may have a shape in which both surfaces are concave. At least one of the third surface S3 and the fourth surface S4 may be an aspherical surface. For example, both the third surface S3 and the fourth surface S4 may be aspherical.

The third lens 130 may have positive (+) or negative (−) refractive power. The third lens 130 may include a plastic or glass material. For example, the third lens 130 may be made of a plastic material. The third lens 130 may include a fifth surface S5 defined as an object-side surface and a sixth surface S6 defined as a sensor-side surface. The fifth surface S5 may be convex, and the sixth surface S6 may be concave. That is, the third lens 130 may have a meniscus shape convex toward the object side. Alternatively, the fifth surface S5 may be convex, and the sixth surface S6 may be convex. That is, the third lens 130 may have a shape in which both surfaces are convex. Alternatively, the fifth surface S5 may be concave, and the sixth surface S6 may be convex. That is, the third lens 130 may have a meniscus shape convex toward the sensor. Alternatively, the fifth surface S5 may be concave, and the sixth surface S6 may be concave. That is, the third lens 130 may have a shape in which both surfaces are concave. At least one of the fifth surface S5 and the sixth surface S6 may be an aspherical surface. For example, both the fifth surface S5 and the sixth surface S6 may be aspherical.

The fourth lens 140 may have positive (+) or negative (−) refractive power. The fourth lens 140 may include a plastic or glass material. For example, the fourth lens 140 may be made of a plastic material. The fourth lens 140 may include a seventh surface S7 defined as an object-side surface and an eighth surface S8 defined as a sensor-side surface. The seventh surface S7 may be concave, and the eighth surface S8 may be convex. That is, the fourth lens 140 may have a meniscus shape convex toward the sensor. Alternatively, the seventh surface S7 may be concave, and the eighth surface S8 may be concave. That is, the fourth lens 140 may have a shape in which both surfaces are concave. At least one of the seventh surface S7 and the eighth surface S8 may be an aspherical surface. For example, both the seventh surface S7 and the eighth surface S8 may be aspherical.

The fifth lens 150 may have positive (+) or negative (−) refractive power. The fifth lens 150 may include a plastic or glass material. For example, the fifth lens 150 may be made of a plastic material. The fifth lens 150 may include a ninth surface S9 defined as an object-side surface and a tenth surface S10 defined as a sensor-side surface. The ninth surface S9 may be convex, and the tenth surface S10 may be convex. That is, the fifth lens 150 may have a shape in which both surfaces are convex. Alternatively, the ninth surface S9 may be concave, and the tenth surface S10 may be convex. That is, the fifth lens 150 may have a meniscus shape convex toward the sensor. At least one of the ninth surface S9 and the tenth surface S10 may be an aspherical surface. For example, both the ninth surface S9 and the tenth surface S10 may be aspherical.

At least one of the plurality of lenses 100 may have a non-circular shape. For example, the first lens 110 may have a non-circular shape. In detail, the first surface S1 and the second surface S2 of the first lens 110 may have a non-circular shape, and the third to tenth surfaces S3, S4, S5, S6, S7, S8, S9, and S10 of the second to fifth lenses 120, 130, 140 and 150 may have a circular shape. That is, when each of the first surface S1 and the second surface S2 is viewed from the front corresponding to the optical axis OA, the effective region of each lens surface may have a non-circular shape.

Referring to FIG. 5, the effective region of each of the first surface S1 and the second surface S2 of the first lens 110 may include first to fourth edges A1, A2, A3, and A4. The first edge A1 and the second edge A2 may be edges facing in a first direction (x-axis direction) perpendicular to the optical axis OA. The first edge A1 and the second edge A2 may have a curved shape. The first edge A1 and the second edge A2 may be provided in a curved shape having the same length and curvature. That is, the first edge A1 and the second edge A2 may have a symmetrical shape based on a virtual line passing through the optical axis OA and extending in the second direction (y-axis direction). The third edge A3 and the fourth edge A4 may be edges facing the second direction (y-axis direction) perpendicular to the optical axis OA and the first direction. The third edge A3 and the fourth edge A4 may be edges connecting ends of the first edge A1 and the second edge A2. The third edge A3 and the fourth edge A4 may have a straight-line shape. The third edge A3 and the fourth edge A4 may have the same length and may be parallel to each other. That is, the third edge A3 and the fourth edge A4 may have a symmetrical shape based on a virtual line that passes through the optical axis OA and extends in the first direction (x-axis direction). The first surface S1 and the second surface S2 include the first to fourth edges A1, A2, A3, A4, and thus may have a non-circular shape, for example, a D-cut shape. The first surface S1 and the second surface S2 may have the non-circular shape described above in the process of manufacturing the first lens 110. For example, when the first lens 110 includes a plastic material, it may be manufactured in the non-circular shape described above during the injection process. Alternatively, the first lens 110 may be manufactured in a circular shape through an injection process, and in the subsequent cutting process, and may have the third edge A3 and the fourth edge A4 from which a portion of the first surface S1 and the second surface S2 are cut.

Accordingly, the effective region of each of the first surface S1 and the second surface S2 may have a set size. For example, a length CA (clear aperture) of a first virtual straight line passing through the optical axis OA and connecting the first edge A1 and the second edge A2 may be longer than a length CH (clear height) of a second virtual straight line passing through the optical axis OA and connecting the third edge A3 and the fourth edge A4. Here, the length CA of the first straight line may mean a clear aperture CA of each of the first and second surfaces S1 and S2, and the length CH of the second straight line may mean a size (clear height) of a minimum effective diameter of each of the first and second surfaces S1 and S2. For example, a size CH of the minimum effective diameter of the first surface S1 and the second surface S2 may be about 4 mm. In the above description, it has been described that the effective regions of the first and second surfaces S1 and S2 have a non-circular shape, but the invention is not limited thereto, and each of the effective regions of the first and second surfaces S1 and S2 may have a circular shape, and the ineffective regions of each of the first and second surfaces S1 and S2 may have a non-circular shape.

The camera module (not shown) according to the embodiment may include the above-described optical system 1000. The camera module may move at least one of the plurality of lenses 100 included in the optical system 1000 in the optical axis OA direction. In detail, the camera module may include a driving member (not shown) connected to the optical system 1000. The driving member may move at least one lens group in an optical axis OA direction according to an operation mode. The operation mode may include a first mode defined as an infinity mode and a second mode defined as a near mode. The driving member may move at least one lens group according to the first and second modes, and may be controlled at least one of the interval between the first lens group G1 and the second lens group G2, and an interval between the second lens group G2 and the image sensor 300. Here, the near distance may mean a distance of about 40 mm or less. In detail, the near distance may mean a distance of about 30 mm or less.

For example, as shown in FIGS. 1 to 4, the first lens group G1 may be fixed and the second lens group G2 may be provided to be movable by the driving force of the driving member. In this case, the interval between the lenses included in each of the first and second lens groups G1 and G2 may be constant without changing. In detail, when the second lens group G2 moves, the interval between the fourth lens 140 and the fifth lens 150 included in the second lens group G2 may be constant regardless of the driving force of the driving member. Accordingly, the total track length (TTL) of the optical system 1000 may be constant, and the back focal length (BFL) of the optical system 1000 may vary depending on an applied driving force.

When the first lens group G1 is fixed in the optical system 1000 and the second lens group G2 is provided to be movable, the plurality of lenses 100 included in each of the first lens group G1 and the second lens group G2 may have a size of a set effective diameter (clear aperture). In detail, each of the first to tenth surfaces S1, S2, S3, S4, S5, S6, S7, S8, S9, and S10 may have a size of a set effective diameter. A size of the effective diameter of each of the first to tenth surfaces S1, S2, S3, S4, S5, S6, S7, S8, S9, S10 may be smaller than a size of the image sensor 300, for example, a diagonal length (ImgH) of the image sensor 300.

The lens surface having the largest effective diameter in the optical system 1000 may be included in the fixed lens group. For example, the lens surface having the largest effective diameter among the first to tenth surfaces S1, S2, S3, S4, S5, S6, S7, S8, S9, and S10 may be included the first lens group G1. The lens surface having the smallest effective diameter may be included in the moving lens group. In detail, the lens surface having the smallest effective diameter among the first to tenth surfaces S1, S2, S3, S4, S5, S6, S7, S8, S9, S10 may be included in the second lens group G2. For example, the effective diameter of the eighth surface S8 among the first to tenth surfaces S1, S2, S3, S4, S5, S6, S7, S8, S9, and S10 may be the smallest.

As described above, the first lens group G1 may have positive (+) refractive power, and the second lens group G2 may have negative (−) refractive power. In this case, when the camera module changes from the first mode to the second mode, the second lens group G2 may move from the first lens group G1 toward the image sensor 300. In detail, the second lens group G2 may move to a position closer to the image sensor 300. Alternatively, when the first lens group G1 has negative refractive power and the second lens group G2 has positive refractive power, the second lens group G2 may move in a direction opposite to the above case, for example, in the direction of the first lens group G1 from the image sensor 300. In detail, the second lens group G2 may move away from the image sensor 300 and move to a position closer to the first lens group G1.

The camera module according to the embodiment controls the position of at least one lens group among the plurality of lens groups G1 and G2 to control the interval between the lens groups G1 and G2 and to change the effective focal length (EFL) of the optical system 1000. Accordingly, the camera module may control the effective focal length (EFL) according to the distance from the subject, and may effectively provide the autofocus (AF) function for the subject located at infinity or a near distance.

Although not shown in the drawings, the second lens group G2 may be fixed, and the first lens group G1 may be provided to be movable by the driving force of the driving member. In this case, the interval between the lenses included in each of the first and second lens groups G1 and G2 may be constant without changing. In detail, when the first lens group G1 moves, each of the interval between the first lens 110 and the second lens 120 included in the first lens group G1 and an interval between the second lens 120 and the third lenses 130 may be constant regardless of the driving force of the driving member. Accordingly, a back focal length (BFL) of the optical system 1000 may be constant, and a total track length (TTL) of the optical system 1000 may vary.

The optical system 1000 according to the embodiment may satisfy at least one of the following equations. Accordingly, the optical system 1000 according to the embodiment may have improved aberration characteristics and thus improved optical characteristics. In addition, the embodiment may effectively provide an autofocus (AF) function for a subject located from a short distance to infinity, and may be provided in a slimmer and more compact manner.

$$-1.5 < f\_2/f\_1 < 0 \qquad \text{[Equation 1]}$$

In Equation 1, f_1 means a focal length of the first lens group G1, and f_2 means a focal length of the second lens group G2.

$$n\_G2 \le n\_G1 \qquad \text{[Equation 2]}$$

In Equation 2, n_G1 means a number of lenses included in the first lens group G1, and n_G2 means a number of lenses included in the second lens group G2.

$$1 < L\_G1/L\_G2 < 4 \qquad \text{[Equation 3]}$$

In Equation 3, L_G1 means a distance in the optical axis (OA) direction from the apex of the object-side surface of the lens closest to the object among the lenses included in the first lens group G1 to the apex of the sensor-side surface of the lens closest to the image sensor 300. In addition, L_G2 means a distance in the optical axis (OA) direction from the apex of the object-side surface of the lens closest to the object among the lenses included in the second lens group G2 to the apex of the sensor-side surface of the lens closest to the image sensor 300.

$$1.5 < TTL/L\_G1 < 3.5 \qquad \text{[Equation 4]}$$

In Equation 4, L_G1 means a distance in the optical axis (OA) direction from the apex of the object-side surface of the lens closest to the object among the lenses included in the first lens group G1 to the apex of the sensor-side surface of the lens closest to the image sensor 300. TTL means a distance in the optical axis (OA) direction from the apex of the object-side surface of the lens closest to the object among the plurality of lenses 100 to the upper surface of the image sensor 300.

$$4 < TTL/L\_G2 < 7 \qquad \text{[Equation 5]}$$

In Equation 5, L_G2 means a distance in the optical axis (OA) direction from the apex of the object-side surface of the lens closest to the object among the lenses included in the second lens group G2 to the apex of the sensor-side surface of the lens closest to the image sensor 300. TTL means a distance in the optical axis (OA) direction from the apex of the object-side surface of the lens closest to the object among the plurality of lenses 100 to the upper surface of the image sensor 300.

$$0.8 < CA\_L1S2/CA\_L1S1 < 1 \qquad \text{[Equation 6]}$$

13

In Equation 6, CA_L1S1 means a size of the effective diameter (CA: clear aperture) of the object-side surface (the first surface S1) of the first lens 110, and CA_L1S2 means a size of the effective diameter (CA: clear aperture) of the sensor-side surface (the second surface S2) of the first lens 110.

$$0.5 < CA\_L3S1/CA\_L1S1 < 0.8 \quad \text{[Equation 7]}$$

In Equation 7, CA_L1S1 means a size of the effective diameter (CA: clear aperture) of the object-side surface (the first surface S1) of the first lens 110, and CA_L3S1 means a size of the effective diameter (CA: clear aperture) of the object-side surface (the fifth surface S5) of the third lens 130.

$$CA\_L1S1 > CA\_L1S2 > CA\_L3S1 > \quad \text{[Equation 7]}$$
$$CA\_L3S2 > CA\_L2S1 > CA\_L2S2$$

In Equation 8, CA_L1S1 means a size of the effective diameter (CA: clear aperture) of the object-side surface (the first surface S1) of the first lens 110, and CA_L1S2 means a size of the effective diameter (CA: clear aperture) of the sensor-side surface (the second surface S2) of the first lens 110. In addition, CA_L2S1 means a size of the effective diameter (CA: clear aperture) of the object-side surface (the third surface S3) of the second lens 120, and CA_L2S2 means a size of the effective diameter (CA: clear aperture) of the sensor-side surface (the fourth surface S4) of the second lens 120. In addition, CA_L3S1 means a size of the effective diameter (CA: clear aperture) of the object-side surface (the fifth surface S5) of the third lens 110, and CA_L3S2 means a size of the effective diameter (CA: clear aperture) of the sensor-side surface (the sixth surface S6) of the third lens 130.

$$1 < T12/L1\_CT < 2.5 \quad \text{[Equation 9]}$$

In Equation 9, T12 means a center interval between the first lens 110 and the second lens 120, and L1_CT means a center thickness of the first lens 110.

$$1 < L1\_CT/L2\_CT < 10 \quad \text{[Equation 10]}$$

In Equation 10, L1_CT means a center thickness of the first lens 110, and L2_CT means a center thickness of the second lens 120.

$$0.1 < L2\_CT/L3\_CT < 1 \quad \text{[Equation 11]}$$

In Equation 11, L2_CT means a center thickness of the second lens 120, and L3_CT means a center thickness of the third lens 130.

$$0.1 < L4\_CT/L5\_CT < 1 \quad \text{[Equation 12]}$$

14

In Equation 12, L4_CT means a center thickness of the fourth lens 140, and L5_CT means a center thickness of the fifth lens 150.

$$2 < L5\_CT/T45 < 4 \quad \text{[Equation 13]}$$

In Equation 13, L5_CT means a center thickness of the fifth lens 150, and T45 means a center interval between the fourth lens 140 and the fifth lens 150.

$$0.1 < L\_G1/TTL < 1 \quad \text{[Equation 14]}$$

In Equation 14, L_G1 means a distance of the first lens group G1 in the optical axis OA direction. In detail, L_G1 means a distance in the optical axis (OA) direction from the apex of the object-side surface of the lens closest to the object in the first lens group G1 to the apex of the sensor-side surface of the last lens closest to the image sensor. TTL means a distance in the optical axis (OA) direction from the apex of the object-side surface of the lens closest to the object among the plurality of lenses 100 to the upper surface of the image sensor 300.

$$0.6 < CH\_L1S1/CA\_L1S1 < 1 \quad \text{[Equation 15]}$$

In Equation 15, CA_L1S1 means a size of the maximum effective diameter (CA: clear aperture) of the object-side surface (the first surface S1) of the first lens 110, and CH_L1S1 means a size of the minimum effective diameter (CH: clear height) of the object-side surface (the first surface S1) of the first lens 110.

$$0.05 < L\_G2/TTL < 1 \quad \text{[Equation 16]}$$

In Equation 16, L_G2 means a distance of the second lens group G2 in the optical axis OA direction. In detail, L_G2 means a distance in the direction of the optical axis (OA) from the apex of the object-side surface of the lens closest to the object in the second lens group G2 to the apex of the sensor-side surface of the last lens closest to the image sensor. TTL means a distance in the optical axis (OA) direction from the apex of the object-side surface of the lens closest to the object among the plurality of lenses 100 to the upper surface of the image sensor 300.

$$3 < L\_G1/md1 < 6.5 \quad \text{[Equation 17]}$$

In Equation 17, L_G1 means a distance of the first lens group G1 in the optical axis OA direction. In detail, L_G1 means a distance in the optical axis (OA) direction from the apex of the object-side surface of the lens closest to the object in the first lens group G1 to the apex of the sensor-side surface of the last lens closest to the image sensor. md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1.

$$1 < L\_G2/md1 < 3.5 \qquad \text{[Equation 18]}$$

In Equation 18, L_G2 means a distance of the second lens group G2 in the optical axis OA direction. In detail, L_G2 means a distance in the direction of the optical axis (OA) from the apex of the object-side surface of the lens closest to the object in the second lens group G2 to the apex of the sensor-side surface of the last lens closest to the image sensor. md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1.

$$0.15 < md1/CA\_Sa < 1 \qquad \text{[Equation 19]}$$

In Equation 19, md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1. CA_Sa means an effective diameter value of a lens surface having a size of the largest effective diameter (clear aperture) among the lens surfaces of the plurality of lenses 100.

$$0.3 < md1/CA\_Sb < 1 \qquad \text{[Equation 20]}$$

In Equation 20, md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1. CA_Sb means an effective diameter value of a lens surface having a size of the smallest effective diameter (clear aperture) among the lens surfaces of the plurality of lenses 100.

$$2 < TTL/md1 < 20 \qquad \text{[Equation 21]}$$

In Equation 21, TTL (Total Track Length) means a distance in the optical axis (OA) direction from the apex of the object-side surface of the lens closest to the object among the plurality of lenses 100 to the upper surface of the image sensor 300. md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1.

$$0.1 < md1/ImgH < 1 \qquad \text{[Equation 22]}$$

In Equation 22, md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1. ImgH means a vertical distance of the optical axis OA from a region of 0 field of the image sensor 300 to a region of 1.0 field of the image sensor 300. That is, the ImgH means a diagonal length of the effective region of the image sensor 300.

$$0.1 < CA\_Sa/ImgH < 1 \qquad \text{[Equation 23]}$$

In Equation 23, CA_Sa means an effective diameter value of a lens surface having a size of the largest effective diameter (clear aperture) among the lens surfaces of the plurality of lenses 100, and ImgH means a vertical distance of the optical axis OA from a region of 0 field of the image sensor 300 to a region of 1.0 field of the image sensor 300. That is, the ImgH means a diagonal length of the effective region of the image sensor 300.

$$0.2 < CA\_Sb/ImgH < 0.9 \qquad \text{[Equation 24]}$$

In Equation 24, CA_Sb means an effective diameter value of a lens surface having a size of the smallest effective diameter (clear aperture) among the lens surfaces of the plurality of lenses 100, and ImgH means a vertical distance of the optical axis OA from a region of 0 field of the image sensor 300 to a region of 1.0 field of the image sensor 300. That is, the ImgH means a diagonal length of the effective region of the image sensor 300.

$$10 < EFL1/T34\_1 < 60 \qquad \text{[Equation 25]}$$

In Equation 25, EFL1 means an effective focal length EFL of the optical system 1000 when operating on the first mode (infinity mode), and T34_1 means a center interval between the first lens group G1 and the second lens group G2 when operating on the first mode (infinity mode). In detail, T34_1 means a center interval between the third lens 130 and the fourth lens 140.

$$1 < EFL1/BFL1 < 5 \qquad \text{[Equation 26]}$$

In Equation 26, EFL1 means an effective focal length EFL of the optical system 1000 when operating on the first mode (infinity mode), and BFL1 means a distance in the direction of the optical axis (OA) from the apex of the sensor-side surface of the last lens to the upper surface of the image sensor 300 when operating on the first mode (infinity mode). In detail, BFL1 means a distance in the optical axis (OA) direction from the apex of the sensor side surface (the tenth surface S10) of the fifth lens 150 to the upper surface of the image sensor 300 on the first mode.

$$5 < EFL1/md1 < 18 \qquad \text{[Equation 27]}$$

In Equation 27, EFL1 means an effective focal length (EFL) of the optical system 1000 when operating on the first mode (infinity mode), and md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1.

$$2 < EFL2/T34\_2 < 8 \qquad \text{[Equation 28]}$$

In Equation 28, EFL2 means an effective focal length (EFL) of the optical system 1000 when operating on the second mode (near mode), and T34_2 means a center interval between the lens group G1 and the second lens group G2 when operating on the second mode (near mode). In detail, T34_2 means a center interval between the third lens 130 and the fourth lens 140.

$$1 < EFL2/BFL2 < 4 \qquad \text{[Equation 29]}$$

In Equation 29, EFL2 means an effective focal length (EFL) of the optical system 1000 when operating on the second mode (near mode), and BFL2 means a distance in the optical axis (OA) direction from the apex of the sensor-side surface of the last lens to the upper surface of the image sensor 300 when operating on the second mode (near mode). In detail, BFL2 means a distance in the optical axis (OA) direction from the apex of the sensor-side surface (the tenth surface S10) of the fifth lens 150 to the upper surface of the image sensor 300 on the second mode.

$$3 < EFL2/md1 < 12 \qquad \text{[Equation 30]}$$

In Equation 30, EFL2 means an effective focal length (EFL) of the optical system 1000 when operating in the second mode (near mode), and md1 means a moving distance of the moving second lens group G2 when changing from infinity mode (first mode) to near mode (second mode) or from near mode (second mode) to infinity mode (first mode). In detail, md1 means a value for a difference between the second interval d2 and the first interval d1.

The embodiment may satisfy at least one or two or more of Equations 1 to 30. Accordingly, the optical system 1000 and the camera module may have improved optical properties. In addition, the embodiment satisfies at least one of Equations 1 to 30, thereby minimizing the amount of curvature caused by the movement of the lens group, and providing the autofocusing (AF) function on a subject located at various distances. In addition, the embodiment may be provided in a slim structure by satisfying at least one of Equations 1 to 30. The optical system 1000 and the camera module according to the embodiment may have excellent curvature aberration characteristics by satisfying Equation 1 above.

TABLE 1

| A result of Equation 1(f_2/f_1) | Amount of curvature (mm) |
| --- | --- |
| −0.4447 | −0.02925 |
| −0.8399 | −0.01041 |
| −1.1597 | 0.119402 |
| −1.3908 | 0.780061 |
| −1.4543 | 1.677117 |
| −1.5209 | 10.6856 |
| −1.5911 | −3.61428 |
| −1.7175 | −1.4527 |
| −2.3191 | −0.90102 |
| −2.9463 | −0.98717 |
| −3.3864 | −1.08481 |
| −4.7675 | −1.43251 |
| −7.8750 | −2.24839 |
| −11.5721 | −3.21877 |

Referring to Table 1 and FIG. 6, the ratio of the focal length f_1 of the first lens group G1 to the focal length f_2 of the second lens group G2 may be the same as above. For example, at a point where the focal length values (f_2/f_1) of the two lens groups G1 and G2 are greater than or equal to −10, the curvature aberration may approach zero (0) as it approaches the region of −1.5 (from left to right in FIG. 6). However, it may be seen that the curvature aberration diverges to zero (0) at positive (+) infinity as the values (f_2/f_1) for the focal lengths of the two lens groups G1 and G2 go from −1.5 to 0 (left to right in FIG. 6). When the value (f_2/f_1) of Equation 1 is less than −1.5, the curvature aberration diverges to minus (−) infinity, so there may be no optically usable region, and the optical characteristic of the optical system 1000 may be significantly reduced. However, when the value (f_2/f_1) of Equation 1 satisfies the above-described range, the curvature aberration may converge to zero. Accordingly, the embodiment may have improved optical properties by minimizing the amount of curvature generated according to the movement of the lens group when the focus is changed in the infinity to near range.

Hereinafter, the plurality of lenses 100 according to the embodiment will be described in more detail. In detail, the plurality of lenses 100 when the first lens group G1 is fixed and the second lens group G2 is provided to be movable in the optical system 1000 will be described in detail.

TABLE 2

| Lens | Surface | Radius of curvature | Thickness(mm)/ Interval (mm) | Index | Abbe # | Effective diameter (mm) |
| --- | --- | --- | --- | --- | --- | --- |
| Lens 1 | S1 | 6.4903 | 1.8000 | 1.5434 | 56.0000 | 5.388 |
|  | S2 | −238.7295 | 2.6325 |  |  | 4.7429 |
| Lens 2 | S3 | −21.1663 | 0.3000 | 1.6140 | 25.9000 | 3.8763 |
|  | S4 | 3.9474 | 0.1000 |  |  | 3.8596 |
| Lens 3 | S5 | 3.1773 | 1.4286 | 1.5348 | 56.0000 | 3.9377 |
|  | S6 | −4.1889 | 0.4311 |  |  | 3.9 |
| Lens 4 | S7 | −3.7710 | 0.4604 | 1.5434 | 56.0000 | 3.14 |
|  | S8 | 5.2314 | 0.7398 |  |  | 2.9831 |

TABLE 2-continued

| Lens | Surface | Radius of curvature | Thickness(mm)/ Interval (mm) | Index | Abbe # | Effective diameter (mm) |
|---|---|---|---|---|---|---|
| Lens 5 | S9 | 11.9070 | 1.8000 | 1.6610 | 20.4000 | 3.2082 |
| | S10 | −31.7323 | | | | 4 |

TABLE 3

| | |
|---|---|
| TTL(TTL1) | 17.3029 mm |
| BFL(BFL1) | 7.6011 mm |
| EFL(EFL1) | 17.1 mm |
| ImgH | 6.428 mm |
| First interval (d1) | 0.4311 mm |

Table 2 shows lens information when the camera module operates in the first mode, which is the infinity mode. In detail, Table 1 shows the radius of curvature of the first to fifth lenses 110, 120, 130, 140 and 150 in the infinity mode, the thickness of each lens, and each of the center intervals between lenses, the refractive index, Abbe Number, and a size of the effective diameter (clear aperture). Table 3 shows a size of the image sensor 300 and data on TTL, BFL (BFL1), EFL (EFL1), field of view (FOV), and F-number when operating in infinity mode.

Referring to Table 2, the first lens 110 of the optical system 1000 according to the embodiment may have a positive (+) refractive power. The first surface S1 of the first lens 110 may be convex, and the second surface S2 may be convex. The first lens 110 may have a shape in which both sides are convex. The first surface S1 may be an aspherical surface, and the second surface S2 may be an aspherical surface. The second lens 120 may have negative (−) refractive power. The third surface S3 of the second lens 120 may be concave, and the fourth surface S4 may be concave. The second lens 120 may have a concave shape on both sides. The third surface S3 may be an aspherical surface, and the fourth surface S4 may be an aspherical surface. The third lens 130 may have positive (+) refractive power. The fifth surface S5 of the third lens 130 may be convex, and the sixth surface S6 may be convex. The third lens 130 may have a shape in which both sides are convex. The fifth surface S5 may be an aspherical surface, and the sixth surface S6 may be an aspherical surface. The fourth lens 140 may have negative (−) refractive power. The seventh surface S7 of the fourth lens 140 may be concave, and the eighth surface S8 may be concave. The fourth lens 140 may have a concave shape on both sides. The seventh surface S7 may be an aspherical surface, and the eighth surface S8 may be an aspherical surface. The fifth lens 150 may have negative (−) refractive power. The ninth surface S9 of the fifth lens 150 may be convex, and the tenth surface S10 may be convex. The fifth lens 150 may have a shape in which both sides are convex. The ninth surface S9 may be an aspherical surface, and the tenth surface S10 may be an aspherical surface.

Referring to Tables 2 and 3, the camera module may operate in an infinity mode to acquire information on a subject located at an infinity distance. In detail, the driving member may operate in the infinity mode by controlling the position of at least one lens group among the plurality of lens groups. For example, when the camera module operates in the infinity mode, the first lens group G1 may be fixed, and the second lens group G2 may be moved by the driving force of the driving member. In detail, in the infinity mode, the second lens group G2 may be disposed at a first position. In this case, when the initial position of the second lens group G2 is not the first position corresponding to the infinity mode, the second lens group G2 may move to the first position. That is, the second lens group G2 may be disposed in a region spaced apart from the first lens group G1 by a first interval d1 by the driving force of the driving member. Here, the first interval d1 may mean a center interval between the third lens 130 and the fourth lens 140. Alternatively, when the initial position of the second lens group G2 is the first position, the second lens group G2 may be disposed at the first position without separate movement. Accordingly, the second lens group G2 may be disposed in a region spaced apart from the first lens group G1 by a first interval d1. When the camera module operates in infinity mode, the optical system 1000 may have a first TTL TTL1 defined as a TTL value at the first position, and a first BFL BFL1 defined as a BFL value, and may have a first EFL EFL1 defined as an effective focal length EFL.

The optical system 1000 may have excellent aberration characteristics as shown in FIG. 7. In detail, FIG. 7 is a graph showing the aberration characteristics of the optical system 1000 operating in the first mode (infinity mode), and is a graph of measuring spherical aberration (Longitudinal Spherical Aberration), astigmatic field curves and distortion aberration from left to right. In FIG. 7, the X-axis may indicate a focal length (mm) and distortion (%), and the Y-axis may indicate the height of an image. In addition, the graph for spherical aberration is a graph for light in the wavelength bands of about 435 nm, about 486 nm, about 546 nm, about 587 nm, and about 656 nm, and the graph for astigmatism and distortion aberration is a graph for light in the wavelength band of 546 nm.

TABLE 4

| Lens | Surface | Radius of curvature | Thickness(mm)/ Interval (mm) | Index | Abbe # | Effective diameter (mm) |
|---|---|---|---|---|---|---|
| Lens 1 | S1 | 6.4903 | 1.8000 | 1.5434 | 56.0000 | 5.388 |
| | S2 | −238.7295 | 2.6325 | | | 4.7429 |
| Lens 2 | S3 | −21.1663 | 0.3000 | 1.6140 | 25.9000 | 3.8763 |
| | S4 | 3.9474 | 0.1000 | | | 3.8596 |
| Lens 3 | S5 | 3.1773 | 1.4286 | 1.5348 | 56.0000 | 3.9377 |
| | S6 | −4.1889 | 2.0311 | | | 3.9 |
| Lens 4 | S7 | −3.7710 | 0.4604 | 1.5434 | 56.0000 | 3.14 |
| | S8 | 5.2314 | 0.7398 | | | 2.9831 |

TABLE 4-continued

| Lens | Surface | Radius of curvature | Thickness(mm)/ Interval (mm) | Index | Abbe # | Effective diameter (mm) |
|------|---------|---------------------|------------------------------|-------|--------|-------------------------|
| Lens 5 | S9 | 11.9070 | 1.8000 | 1.6610 | 20.4000 | 3.2082 |
|        | S10 | −31.7323 |  |  |  | 4 |

TABLE 5

| | |
|---|---|
| TTL (TTL2) | 17.3029 mm |
| BFL (BFL2) | 6.01 mm |
| EFL (EFL 2) | 10.4269 mm |
| ImgH | 6.428 mm |
| Second interval (d2) | 2.311 |

Table 4 shows lens information when the camera module operates in the second mode, which is the near mode. In detail, Table 4 shows the radius of curvature of the first to fifth lenses 110, 120, 130, 140 and 150 in the near mode, the thickness of each lens, and each of the center interval between lenses, Refractive index, Abbe Number, a size of the effective diameter (clear aperture). Table 5 shows data on a size of the image sensor 300, TTL, BFL (BFL2), EFL (EFL2), angle of view (FOV), and F-number when operating in near mode. Referring to Tables 4 and 5, the camera module may obtain information on a subject located in a near distance by operating in a near mode. When the subject is located in a near distance, the driving member may control a position of at least one lens group among the plurality of lens groups to operate in a near mode. For example, when the camera module operates in the near mode, the first lens group G1 may be fixed, and the second lens group G2 may be moved by the driving force of the driving member. In detail, in the near mode, the second lens group G2 may be disposed at a second position. In this case, when the initial position of the second lens group G2 is not the second position corresponding to the near mode, the second lens group G2 may move to the second position. That is, the second lens group G2 may be disposed in a region spaced apart from the first lens group G1 by a second interval d2 by the driving force of the driving member. Here, the second interval d2 may mean a center interval between the third lens 130 and the fourth lens 140. Alternatively, when the initial position of the second lens group G2 is the second position, the second lens group G2 may be disposed at the second position without a separate movement. Accordingly, the second lens group G2 may be disposed in a region spaced apart from the first lens group G1 by a second interval d2. When the camera module operates in the near mode, the interval between the first lens group G1 and the second lens group G2, for example, an interval between the third lens 130 and the fourth lens 140 may vary, compared to the infinity mode. When the camera module operates in the near mode, the optical system 1000 may have a second TTL TTL2 defined as a TTL value at the second position, and a second BFL BFL2 defined as a BFL value, and may have a second EFL EFL2 defined as an effective focal length (EFL). The second TTL TTL2 may be the same as the first TTL TTL1. That is, as the first lens group G1 is fixed, the first TTL TTL1 and the second TTL may be the same. Also, the second EFL may be smaller than the first EFL, and the second BFL BFL2 may be smaller than the first BFL BFL1. In detail, as the first lens group G1 has positive (+) refractive power and the second lens group G2 has negative (−) refractive power, the second BFL BFL2 may be smaller than BFL (BFL1).

Referring to FIG. 8, the optical system 1000 may have excellent aberration characteristics. In detail, FIG. 8 is a graph of the aberration characteristics of the optical system 1000 operating in the second mode (near mode), and is a graph of measuring spherical aberration (Longitudinal Spherical Aberration), astigmatic field curves and distortion aberration from left to right. In FIG. 8, the X-axis may indicate a focal length (mm) and distortion (%), and the Y-axis may indicate the height of an image. In addition, the graph for spherical aberration is a graph for light in the wavelength bands of about 435 nm, about 486 nm, about 546 nm, about 587 nm, and about 656 nm, and the graph for astigmatism and distortion aberration is a graph for light in the wavelength band of 546 nm. The camera module according to the embodiment may be converted into an infinity mode or a near mode according to a distance from a subject. In this case, the second lens group G2 may move to the first position or the second position according to a distance from the subject. For example, the second lens group G2 may move from the first position to the second position or move from the second position to the first position. The moving distance md1 of the second lens group G2 may be smaller than the total TTL value of the optical system 1000, for example, the first TTL TTL1 and the second TTL TTL2. Also, the moving distance md1 of the second lens group G2 may be smaller than that of the first BFL BFL1 and the second BFL BFL2. The moving distance md1 of the second lens group G2 may be smaller than the diagonal length ImgH of the image sensor 300, and may be smaller than a size of the effective diameter (CA_Sa) of the lens having the largest effective diameter among the plurality of lens surfaces. For example, the moving distance md1 of the second lens group G2 may be about 1 mm or more. In detail, the moving distance of the second lens group G2 may be about 1.6 mm. Here, the moving distance md1 may mean a difference between the second interval d2 and the first interval d1.

TABLE 6

| | Embodiment |
|---|---|
| md1 (a moving distance of the second lens group) | 1.6 mm |
| f1 | 11.6076 |
| f2 | −5.3452 |
| f3 | 3.6086 |
| f4 | −3.9440 |
| f5 | 13.1671 |
| f_1 | 6.59 |
| f_2 | −6.78 |
| ImgH | 6.428 mm |
| EPD | 5.38 mm |
| F-number | 3.1784 |
| Amount of curvature in the first mode | 0 |
| Amount of curvature in the second mode | 0.148 |

TABLE 7

| | Equation | Embodiment |
|---|---|---|
| Equation 1 | −1.5 < f_2/f_1 < 0 | Satisfaction |
| Equation 2 | n_G2 ≤ n_G1 | Satisfaction |
| Equation 3 | 1 < L_G1/L_G2 < 4 | 2.0869 |
| Equation 4 | 1.5 < TTL/L_G1 < 3.5 | 2.7636 |
| Equation 5 | 4 < TTL/L_G2 < 7 | 5.7672 |
| Equation 6 | 0.8 < CA_L1S2/CA_L1S1 < 1 | 0.8803 |
| Equation 7 | 0.5 < CA_L3S1/CA_L1S1 < 0.8 | 0.7308 |
| Equation 8 | CA_L1S1 > CA_L1S2 > CA_L3S1 > CA_L3S2 > CA_L2S1 > CA_L2S2 | Satisfaction |
| Equation 9 | 1 < T12/L1_CT < 2.5 | 1.4625 |
| Equation 10 | 1 < L1_CT/L2_CT < 10 | 6.0000 |
| Equation 11 | 0.1 < L2_CT/L3_CT < 1 | 0.2100 |
| Equation 12 | 0.1 < L4_CT/L5_CT < 1 | 0.2558 |
| Equation 13 | 2 < L5_CT/T45 < 4 | 2.4331 |
| Equation 14 | 0.6 < CH_L1S1/CA_L1S1 < 1 | 0.7424 |
| Equation 15 | 0.1 < L_G1/TTL < 1 | 0.3619 |
| Equation 16 | 0.05 < L_G2/TTL < 1 | 0.1734 |
| Equation 17 | 3 < L_G1/md1 < 6.5 | 3.9132 |
| Equation 18 | 1 < L_G2/md1 < 3.5 | 1.8751 |
| Equation 19 | 0.15 < md1/CA_Sa < 1 | 0.2970 |
| Equation 20 | 0.3 < md1/CA_Sb < 1 | 0.5364 |
| Equation 21 | 2 < TTL/md1 < 20 | 10.8143 |
| Equation 22 | 0.1 < md1/ImgH < 1 | 0.2489 |
| Equation 23 | 0.1 < CA_Sa/ImgH < 1 | 0.8382 |
| Equation 24 | 0.2 < CA_Sb/ImgH < 0.9 | 0.4641 |
| Equation 25 | 10 < EFL1/T34_1 < 60 | 39.6660 |
| Equation 26 | 1 < EFL1/BFL1 < 5 | 2.2470 |
| Equation 27 | 5 < EFL1/md1 < 18 | 10.6875 |
| Equation 28 | 2 < EFL2/T34_2 < 8 | 5.1339 |
| Equation 29 | 1 < EFL2/BFL2 < 4 | 1.7349 |
| Equation 30 | 3 < EFL2/md1 < 12 | 6.5168 |

Table 6 relates to the items of the above-described equations in the optical system and the camera module according to the embodiment, and the moving distance md1 of the movable lens group (the second lens group G2), each focal length (f1, f2, f3, f4, f5) of the first to fifth lenses 110, 120, 130, 140, and 150, the focal length of the first and second lens groups G1 and G2, and the diameter of the entrance pupil (EPD), the amount of curvature, etc. Table 7 shows the result values of Equations 1 to 30 of the optical system 1000 according to the embodiment. Referring to Table 7, it may be seen that the optical system 1000 and the camera module according to the embodiment satisfy at least one or two or more of Equations 1 to 30. In detail, it may be seen that the optical system 1000 and the camera module according to the embodiment satisfy all of Equations 1 to 30 above. Accordingly, the embodiment may have improved optical properties and may inhibit or minimize deterioration of peripheral image quality. In addition, the embodiment may provide an autofocus (AF) function for a subject located at various distances by using the optical system 1000 having a set shape, the focal lengths, the intervals, and the like. In detail, the embodiment may provide an autofocus (AF) function for a subject located at infinity or near distance by using one camera module. In the embodiment, the effective focal length (EFL) may be controlled by moving at least one lens group, and the moving distance of the moving lens group may be minimized. For example, the moving distance md1 of the second lens group G2 according to the embodiment may be 1.6 mm, which is a difference between the second distance d2 and the first distance d1. That is, the second lens group G2 may move 1.6 mm from infinity to a near distance (30 mm) focus. In addition to, it may move about 0.08 mm from infinity to another near (70 mm) focus. On the other hand, in the case of a comparative example (not shown) in which the first and second lens groups are moved to one lens group, it may move about 16 mm from infinity to a near-distance (30 mm) focus, and may move about 0.43 mm from infinity to another near-distance (70 mm) focus. Accordingly, the optical system 1000 according to the embodiment may significantly reduce the movement distance of the lens group compared to the comparative example when the focus is changed from infinity to near field, thereby minimizing power consumption required for moving the lens group. In addition, by minimizing the moving distance of the lens group, the amount of curvature generated according to the moving distance of the moving lens group can be minimized. Accordingly, the optical system according to the embodiment may have improved electrical and optical properties. The embodiment may have a constant TTL value irrespective of the distance from the subject in the range of infinity to near field. Accordingly, the optical system 1000 and the camera module including the same may be provided with a slimmer structure. At least one lens in the optical system 1000 may have a non-circular shape, for example, a D-cut shape. Accordingly, the optical system 1000 may be implemented in a small size, has improved optical performance, and may be provided more compactly compared to an optical system having only a circular shape. The optical system 1000 may include a plurality of lenses and a light path changing member (not shown). Accordingly, the optical system 1000 may be applied to a folded camera that can have a thinner thickness, and a device including the camera may be manufactured with a thin thickness.

Figures 9A, 9B:
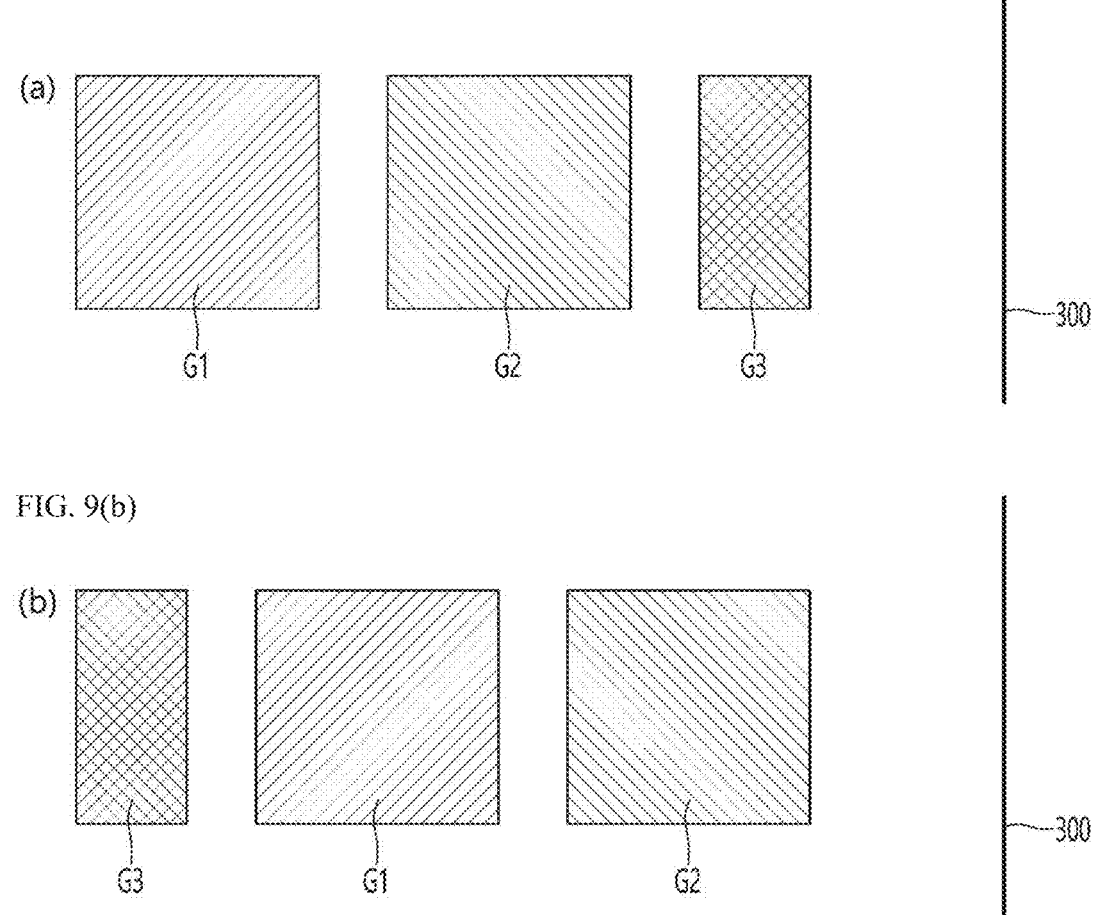
FIGS. 9(*a*) and 9(*b*) are configuration diagrams for explaining that the optical system according to the embodiment further includes a third lens group.

FIGS. 9(*a*) and 9(*b*) are configuration diagram-diagrams for explaining that the optical system according to the embodiment further includes a third lens group.

Referring to FIG. 9 FIGS. 9(*a*) and 9(*b*), the optical system 1000 according to the embodiment may further include a third lens group G3 in addition to the first lens group G1 and the second lens group G2 described above. The third lens group G3 may have positive (+) or negative (−) refractive power. The third lens group G3 may include at least one lens. When the third lens group G3 includes a plurality of lenses, a center interval between the plurality of lenses included in the third lens group G3 may be constant without changing according to an operation mode. The third lens group G3 may be disposed at a set position. For example, the third lens group G3 may be disposed between the second lens group G2 and the image sensor 300 as shown in FIG. 9(*a*). In this case, the third lens group G3 may be fixed like the first lens group G1, and the second lens group G2 may be provided to be movable.

In this case, at least one lens included in the third lens group G3 may have a set effective diameter (clear aperture) size. In detail, a size of the effective diameter of at least one of the plurality of lens surfaces included in the third lens group G3 may be larger than a size of the effective diameter of the object-side surface of the lens disposed closest to the object among the lenses included in the first to third lens groups G1, G2, and G3. The third lens group G3 may be disposed between the object and the first lens group G1 as shown in FIG. 9(*b*). In this case, the first lens group G1 may be fixed like the first lens group G1 or may be provided to be movable like the second lens group G2. In this case, at least one lens included in the third lens group G3 may have a set effective diameter (clear aperture) size. In detail, the optical system 1000 may include a lens surface having an effective diameter larger than an object-side surface of a lens disposed closest to the object in the third lens group G3.

Figure 10:
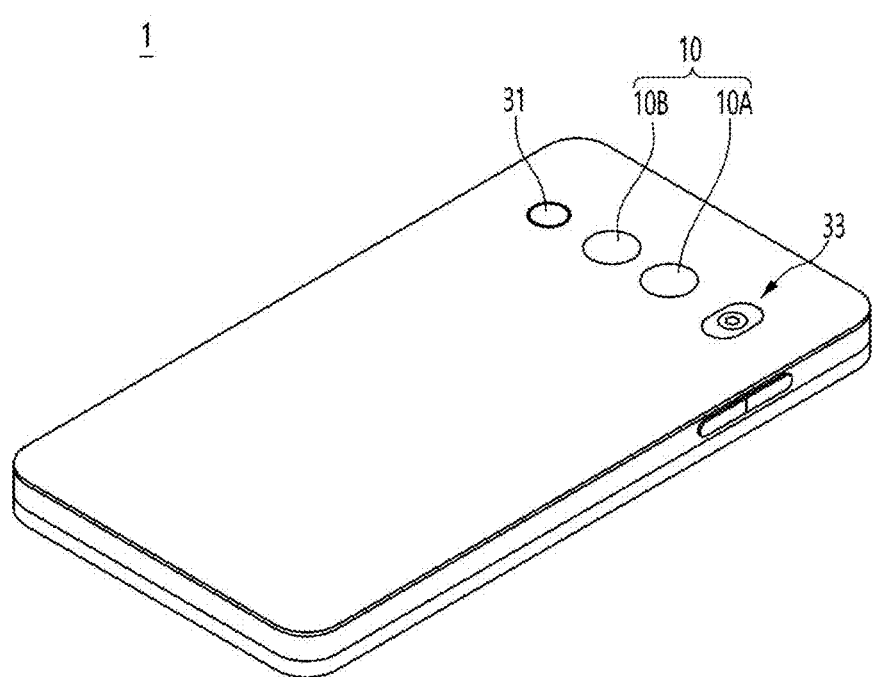
FIG. 10 is a diagram illustrating that the camera module according to the embodiment is applied to a mobile terminal.

FIG. 10 is a diagram illustrating that the camera module according to the embodiment is applied to a mobile terminal.

Referring to FIG. 10, the mobile terminal 1 may include a camera module 10 provided on the rear side. The camera module 10 may include an image capturing function. Also, the camera module 10 may include at least one of an auto focus function, a zoom function, and an OIS function. The camera module 10 may process a still video image or an image frame of a moving image obtained by the image sensor 300 in an imaging mode or a video call mode. The processed image frame may be displayed on a display unit (not shown) of the mobile terminal 1 and may be stored in a memory (not shown). In addition, although not shown in the drawings, the camera module may be further disposed on the front of the mobile terminal 1. For example, the camera module 10 may include a first camera module 10A and a second camera module 10B. In this case, at least one of the first camera module 10A and the second camera module 10B may include the above-described optical system 1000. Accordingly, the camera module 10 may have improved optical characteristics, and may provide an autofocus (AF) function for a subject located in a short distance of infinity to 40 mm or less. In addition, when the at least one lens group moves to provide the above function, the optical system 1000 may minimize the amount of movement of the lens group, thereby operating with low power and minimizing the amount of curvature caused by the movement. In addition, the camera module may be provided more compactly by the optical system 1000 having a slim structure.

The mobile terminal 1 may further include an autofocus device 31. The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emission laser (VCSEL) semiconductor device and a light receiving unit that converts light energy such as a photodiode into electrical energy. The mobile terminal 1 may further include a flash module 33. The flash module 33 may include a light emitting device emitting light therein. The flash module 33 may be operated by a camera operation of a mobile terminal or a user's control.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system consisting of:

first and second lens groups sequentially arranged along an optical axis from an object side to a sensor direction, and including at least one lens, respectively, wherein the first lens group is fixed in the optical system and the second lens group is provided to be movable along the optical axis, wherein a focal length sign of the first lens group and a focal length sign of the second lens group are opposite to each other, wherein the optical system satisfies Equation: $-1.5 < f\_2/f\_1 < 0$ (f_1 is the focal length of the first lens group, and f_2 is the focal length of the second lens group), wherein a size of an effective diameter of the lenses included in the first and second lens groups is smaller than a diagonal length of the image sensor, wherein the first lens group includes a first lens, a second lens, and a third lens sequentially disposed along the optical axis from the object side to the sensor direction, wherein an object side surface of the first lens has a convex shape, wherein a center thickness of the first lens is L1_CT, wherein a center thickness of the second lens is L2_CT, and wherein the optical system satisfies the following Equation: $1 < L1\_CT/L2\_CT < 10$.

2. The optical system of claim 1, wherein the first lens has a positive (+) refractive power, and wherein a sensor-side surface of the first lens has a convex shape.

3. The optical system of claim 1, wherein the first and second lens groups satisfy Equation 1:

$$1 < L\_G1/L\_G2 < 4 \qquad \text{[Equation 1]}$$

(In Equation 1, L_G1 means a distance in the optical axis direction from an apex of an object-side surface of a lens closest to the object among lenses included in the first lens group to an apex of the sensor-side surface of the lens closest to the image sensor, and L_G2 means a distance in the optical axis direction from an apex of an object-side surface of a lens closest to the object among lenses included in the second lens group to an apex of a sensor-side surface of a lens closest to the image sensor).

4. The optical system of claim 1, wherein the second lens group satisfies the following Equation 2:

$$4 < TTL/L\_G2 < 7 \qquad \text{[Equation 2]}$$

(In Equation 2, L_G2 means a distance in the optical axis direction from an apex of an object-side surface of a lens closest to the object among lenses included in the second lens group to an apex of the sensor-side surface of the lens closest to the image sensor, and, TTL (total track length) means a distance in the optical axis direction from the apex of the object-side surface of the lens closest to the object among the plurality of lenses included in the first and second lens groups to an image sensing plane of the image sensor), and wherein the TTL is constant.

5. The optical system of claim 1, wherein the first lens group includes at least one lens having a non-circular shape.

6. A camera module comprising an optical system and a driving member, the camera module comprising:

an optical system according to claim 1, and wherein the driving member controls a position of the second lens group.

7. The optical system of claim 1, wherein the second lens group includes fourth and fifth lenses sequentially arranged along the optical axis from the object side to the sensor direction, and wherein the lens surface having the largest effective diameter among lens surfaces of all of the lenses of the first and second lens groups is included in the first lens group, and the lens surface having the smallest effective diameter among lens surfaces of all of the lenses of the first and second lens groups is included in the second lens group.

8. The optical system of claim 7, wherein the fifth lens has a negative refractive power, and wherein a sensor-side surface of the fifth lens has a convex shape.

9. The optical system of claim 7, wherein an object-side surface of the fourth lens has a concave shape.

10. A optical system consisting of:

a first lens group having a first lens, a second lens, and a third lens sequentially disposed along an optical axis from an object side toward an image sensor; and a second lens group having fourth and fifth lenses sequentially disposed along the optical axis in a direction from the first lens group to the image sensor, wherein the first lens group is fixed in the optical system and the second lens group is provided to be movable along the optical axis, wherein a focal length sign of the first lens group and a focal length sign of the second lens group are opposite to each other, wherein an object side surface of the first lens has a convex shape, wherein a center thickness of the first lens is L1_CT, wherein a center thickness of the second lens is L2_CT, and wherein the optical system satisfies the following Equation: $1 < L1\_CT/L2\_CT < 10$.

11. The optical system of claim 10, wherein a center distance between the first lens and the second lens is T12, and wherein the optical system satisfies the following Equation: $1 < T12/L1\_CT < 2.5$.

12. The optical system of claim 10, wherein the first lens has a positive (+) refractive power, wherein a focal length of the first lens group is f_1, wherein a focal length of the second lens group is f_2, and wherein the optical system satisfies the following Equation: $-1.5 < f\_2/f\_1 < 0$.

13. The optical system of claim 10, wherein a sensor-side surface of the first lens has a convex shape, wherein an object-side surface of the second lens has a concave shape.

14. The optical system of claim 10, wherein the fifth lens has negative (−) refractive power, and wherein a sensor-side surface of the fifth lens has a convex shape.

15. The optical system of claim 10, wherein an object-side surface of the fourth lens has a concave shape, and wherein a sensor-side surface of the fourth lens has a smallest effective diameter among lens surfaces of all of the lenses of the first and second lens groups.

16. The optical system of claim 10, wherein both an object-side surface and a sensor-side surface of the third lens have a convex shape.

17. The optical system of claim 10, wherein the first lens has a non-circular shape, wherein the optical system includes a prism disposed on the object-side surface of the first lens.

18. The optical system of claim 10, wherein a center thickness of the third lens is L3_CT, and wherein the optical system satisfies the following Equation: $0.1 < L2\_CT/L3\_CT < 1$.

19. The optical system of claim 10, wherein a center thickness of the fourth lens is L4_CT, wherein a center thickness of the fifth lens is L5_CT, and wherein the optical system satisfies the following Equation: $0.1 < L4\_CT/L5\_CT < 1$.

20. The optical system of claim 10, wherein a center thickness of the fifth lens is L5_CT, wherein a center distance between the fourth lens and the fourth lens is T45, and wherein the optical system satisfies the following Equation: $2 < L5\_CT/T45 < 4$.

* * * * *